(12) United States Patent
Sengoku et al.

(10) Patent No.: US 9,519,603 B2
(45) Date of Patent: Dec. 13, 2016

(54) METHOD AND APPARATUS TO ENABLE MULTIPLE MASTERS TO OPERATE IN A SINGLE MASTER BUS ARCHITECTURE

(71) Applicant: QUALCOMM Incorporated, San Diego, CA (US)

(72) Inventors: Shoichiro Sengoku, San Diego, CA (US); Richard Dominic Wietfeldt, San Diego, CA (US); George Alan Wiley, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 352 days.

(21) Appl. No.: 14/480,540

(22) Filed: Sep. 8, 2014

(65) Prior Publication Data

US 2015/0074305 A1 Mar. 12, 2015

Related U.S. Application Data

(60) Provisional application No. 61/875,547, filed on Sep. 9, 2013.

(51) Int. Cl.
*G06F 13/378* (2006.01)
*G06F 13/36* (2006.01)
(Continued)

(52) U.S. Cl.
CPC .............. *G06F 13/378* (2013.01); *G06F 13/24* (2013.01); *G06F 13/36* (2013.01); *G06F 13/362* (2013.01); *G06F 2213/3602* (2013.01)

(58) Field of Classification Search
CPC .......... G06F 13/20; G06F 13/22; G06F 13/24; G06F 13/36; G06F 13/368; G06F 13/378
See application file for complete search history.

(56) References Cited

U.S. PATENT DOCUMENTS

| 4,546,351 A | 10/1985 | Nambu |
| 5,088,024 A * | 2/1992 | Vernon ................... G06F 13/37 710/111 |

(Continued)

FOREIGN PATENT DOCUMENTS

| DE | 10250616 C1 | 11/2003 |
| EP | 0192944 A2 | 9/1986 |

(Continued)

OTHER PUBLICATIONS

Chen I A., "An error-correction scheme with Reed-Solomon codec for CAN bus transmission", Intelligent Signal Processing and Communications Systems (ISPACS), 2011 International Symposium on, IEEE, Dec. 7, 2011, pp. 1-5, XP032114635, DOI: 10.1109/ISPACS.2011.6146059 ISBN: 978-1-4577-2165.

(Continued)

Primary Examiner — Thomas J Cleary
(74) Attorney, Agent, or Firm — Loza & Loza, LLP

(57) ABSTRACT

To accommodate multiple masters over bus architectures supporting a single master device, a mechanism is provided for an inactive master device to trigger an IRQ signal over a shared, single line IRQ bus. A current master then polls the other inactive master devices over a shared data bus to ascertain which inactive master device is asserting the IRQ signal. Upon identifying the asserting inactive master device, the current master device grants control of the data bus to the new master device, thereby making the inactive master the new active master device.

28 Claims, 11 Drawing Sheets

(51) Int. Cl.
  *G06F 13/24* (2006.01)
  *G06F 13/362* (2006.01)

(56) References Cited

U.S. PATENT DOCUMENTS

| | | | | |
|---|---|---|---|---|
| 5,144,295 | A * | 9/1992 | Nakagawa | H04L 12/403 340/12.13 |
| 5,321,818 | A | 6/1994 | Wendling et al. | |
| 5,530,875 | A * | 6/1996 | Wach | G06F 13/26 710/264 |
| 5,581,770 | A | 12/1996 | Suzuki | |
| 5,613,128 | A | 3/1997 | Nizar et al. | |
| 5,787,263 | A | 7/1998 | Tamagawa et al. | |
| 6,253,268 | B1 | 6/2001 | Bjorkengren et al. | |
| 6,532,506 | B1 | 3/2003 | Dunstan et al. | |
| 6,609,167 | B1 | 8/2003 | Bastiani et al. | |
| 6,704,823 | B1 * | 3/2004 | Perez | G06F 13/24 710/260 |
| 6,839,393 | B1 | 1/2005 | Sidiropoulos | |
| 7,089,338 | B1 | 8/2006 | Wooten et al. | |
| 7,707,349 | B1 | 4/2010 | Keithley | |
| 8,103,803 | B2 | 1/2012 | Reddy et al. | |
| 8,549,198 | B2 | 10/2013 | Cohen et al. | |
| 9,319,178 | B2 * | 4/2016 | Sengoku | H04L 1/0041 |
| 2007/0088874 | A1 | 4/2007 | Brabant | |
| 2007/0186020 | A1 * | 8/2007 | Drexler | G06F 13/368 710/119 |
| 2009/0315899 | A1 | 12/2009 | Pourbigharaz et al. | |
| 2013/0018979 | A1 | 1/2013 | Cohen et al. | |
| 2014/0025999 | A1 | 1/2014 | Kessler | |
| 2014/0207986 | A1 * | 7/2014 | Guok | H04L 12/28 710/110 |
| 2014/0372644 | A1 * | 12/2014 | Sengoku | G06F 13/4291 710/106 |
| 2015/0030112 | A1 | 1/2015 | Wiley et al. | |
| 2015/0058507 | A1 * | 2/2015 | Sengoku | G06F 13/4226 710/110 |
| 2015/0095537 | A1 | 4/2015 | Sengoku | |
| 2015/0100712 | A1 * | 4/2015 | Sengoku | G06F 13/28 710/110 |
| 2015/0100713 | A1 | 4/2015 | Sengoku | |
| 2015/0100714 | A1 * | 4/2015 | Sengoku | G06F 13/4291 710/110 |
| 2015/0100862 | A1 | 4/2015 | Sengoku | |
| 2015/0199287 | A1 | 7/2015 | Sengoku | |
| 2015/0199295 | A1 | 7/2015 | Sengoku | |
| 2015/0248373 | A1 | 9/2015 | Sengoku | |
| 2015/0254198 | A1 * | 9/2015 | Anderson | G06F 13/364 710/110 |
| 2015/0309960 | A1 * | 10/2015 | Pitigoi-Aron | G06F 13/4291 710/106 |
| 2016/0147684 | A1 * | 5/2016 | Sengoku | G06F 13/24 710/105 |
| 2016/0217090 | A1 | 7/2016 | Sengoku et al. | |

FOREIGN PATENT DOCUMENTS

| | | |
|---|---|---|
| EP | 0588191 A1 | 3/1994 |
| GB | 2173929 A | 10/1986 |
| WO | WO-0042740 A1 | 7/2000 |
| WO | WO-2013052886 A2 | 4/2013 |

OTHER PUBLICATIONS

Corrigan S: "Introduction to the Controller Area Network (CAN)—Application ReportsSLOAAAug. 2002, Revised Jul. 2008", internet article, Jul. 30, 2008 (Jul. 30, 2008), XP002740955, texas Instruments Retrieved from the Internet: URL: http://www.ti.com/lit/an/sloa101a/sloa101a.pdf [retrieved on Jun. 16, 2015] the whole document paragraph [3.1.1].

"I2C—Inter-IC Corrununications, Lectures 28, Oct. 26-29, 2012", internet article, Oct. 29, 2012 (Oct. 29, 2012), XP002740959, Retrieved from the Internet: URL: http://ece.uidaho.edu/ee/classes/ECE340/LectureNotes/L27/I2C.pdf [retrieved on Jun. 16, 2015] the whole document p. 2.

"Tradeoffs when considering SPI or I2C?", internet article, Apr. 1, 2012, XP002735900, Retrieved from the Internet: URL:http://electronics.stackexchange.com/questions/29037/tradeoffs-when-considering-spi-or-i2c [retrieved on Feb. 12, 2015].

International Search Report and Written Opinion—PCT/US2014/054778—ISA/EPO—Oct. 27, 2014.

Shanley T., et al., "PCI System Architecture—Edition 4th, Chapter 5 (106-119) and 14part (291-297)" In: May 31, 1999 (May 31, 1999), Addison-Wesley, XP055145686, the whole document.

* cited by examiner

METHOD AND APPARATUS TO ENABLE MULTIPLE MASTERS TO OPERATE IN A SINGLE MASTER BUS ARCHITECTURE

CROSS-REFERENCE TO RELATED APPLICATIONS

The present Application for Patent claims priority to Provisional Application No. App. No. 61/875,547, entitled "Method and Apparatus to Enable a Multiple Masters to Operate in a Single Master Bus Architecture" filed Sep. 9, 2013, which is assigned to the assignee hereof and hereby expressly incorporated by reference herein.

FIELD

The present disclosure pertains to allowing several master devices to share control of a single-master bus.

BACKGROUND

I2C (also referred to as I²C) is a multi-master serial single-ended bus used for attaching low-speed peripherals to a motherboard, embedded system, cellphone, or other electronic devices. The I2C bus includes a clock (SCL) and data (SDA) lines with 7-bit addressing. The bus has two roles for nodes: master and slave. A master node is a node that generates the clock and initiates communication with slave nodes. A slave node is a node that receives the clock and responds when addressed by the master. The I2C bus is a multi-master bus, which means any number of master nodes can be present. Additionally, master and slave roles may be switched between messages (after a STOP is sent). I2C defines basic types of messages, each of which begins with a START and ends with a STOP.

In this context of a camera implementation, unidirectional transmissions may be used to capture an image from a sensor and transmit such image data to memory in a baseband processor, while control data may be exchanged between the baseband processor and the sensor as well as other peripheral devices. In one example, a Camera Control Interface (CCI) protocol may be used for such control data between the baseband processor and the image sensor (and/or one or more slave nodes). In one example, the CCI protocol may be implemented over an I2C serial bus between the image sensor and the baseband processor.

Legacy I2C implemented multi-master bus arbitration by allowing multiple master devices to drive or pull a bus line low during a slave identifier (ID) period. Whichever master device drives the bus line low the longest wins control of the bus. Unlike legacy I2C, CCI and CCI extension (CCIe) do not allow more than one CCIe device to drive the bus at any time, so the same bus arbitration method for master devices as I2C is not possible.

Therefore, a way is needed to allow a single-master bus to have multiple masters.

SUMMARY

A device is provided, comprising: a single line interrupt request (IRQ) bus, a data bus, and a processing circuit within an active master device. The single line interrupt request (IRQ) bus may have a plurality of master devices coupled to it, wherein the plurality of master devices include an active master device and one or more inactive master devices. The data bus may also have the plurality of master devices coupled to it. The processing circuit within the active master device may be adapted to: (a) manage communications over the data bus for all devices coupled to the data bus based on interrupt signals asserted over the IRQ bus; (b) monitor the IRQ bus to ascertain when an IRQ signal has been asserted; (c) poll the inactive master devices over the data bus to ascertain which inactive master device asserted the IRQ signal on the IRQ bus; and/or (d) hand over control of the data bus to an asserting inactive master device upon obtaining an indication from the inactive master device that it made a master request. The master request from the inactive master device may be obtained over the IRQ bus. The indication from the inactive master device may be obtained over the data bus. In one example, the indication from the inactive master device that it made a master request may be encoded within an unused bit obtained by coding the transmissions from the one or more inactive master devices to the active master device.

In one example, the processing circuit may be further adapted to: (a) identify a group of devices with which the IRQ signal is associated; and/or (b) scan the devices for the identified group to ascertain which device asserted the IRQ signal on the IRQ bus. The IRQ signal associated with each group may have a different pulse width than other IRQ signals associated with other groups.

Additionally, the processing circuit may be further adapted to ascertain if a polled inactive master device asserted the IRQ signal and made the master request by looking at a particular bit in a status register obtained from each of the polled inactive master devices. According to another aspect, the processing circuit may be further adapted to send an indicator to the asserting inactive master device to transfer control of the data bus. In some implementations, at least the asserting inactive master device may switch between a master mode of operation and a slave mode of operation.

A method operational on a device is also provided, comprising: (a) managing communications over a data bus for all devices coupled to the data bus based on interrupt signals asserted over a single line interrupt request (IRQ) bus, wherein a plurality of master devices are coupled to IRQ bus and the data bus; (b) monitoring the IRQ bus to ascertain when an IRQ signal has been asserted; (c) polling the inactive master devices over the data bus to ascertain which inactive master device asserted the IRQ signal on the IRQ bus; and/or (d) handing over control of the data bus to an asserting inactive master device upon obtaining an indication from the inactive master device that it made a master request. In one example, handing over control of the data bus may include the (active) device sending an indicator to the asserting inactive master device to transfer control of the data bus.

According to another aspect, the method may further include: (a) identifying a group of devices with which the IRQ signal is associated; and/or (b) scanning the devices for the identified group to ascertain which device asserted the IRQ signal on the IRQ bus. The IRQ signal may be associated with each group has a different pulse width than other IRQ signals associated with other groups. The method may also include ascertaining if a polled inactive master device asserted the IRQ signal and made the master request by looking at a particular bit in a status register obtained from each of the polled inactive master devices.

An exemplary active master device is also provided, comprising: a first interface, a second interface, and a processing circuit. The first interface may serve to couple the active master device to a single line interrupt request (IRQ) bus to which a plurality of other devices are coupled. The second interface may serve to couple the active master to a data bus to which the plurality of other devices are also coupled. The processing circuit may be adapted to: (a) manage communications over the data bus for all devices coupled to the data bus based on interrupt signals asserted over the IRQ bus; (b) monitor the IRQ bus to ascertain when an IRQ signal has been asserted; (c) poll the inactive master devices over the data bus to ascertain which inactive master device asserted the IRQ signal on the IRQ bus; and/or (d) hand over control of the data bus to an asserting inactive master device upon obtaining an indication from the inactive master device that it made a master request. The master request from the inactive master device may be obtained over the first interface. The indication from the inactive master device may be obtained over the second interface.

DRAWINGS

Various features, nature, and advantages may become apparent from the detailed description set forth below when taken in conjunction with the drawings in which like reference characters identify correspondingly throughout.

DETAILED DESCRIPTION

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures, and techniques may not be shown in detail in order not to obscure the embodiments.

Overview

A first feature provides a way for a plurality of master devices to share a single-master bus. In some bus architectures (e.g., CCI and CCIe), only a single master is allowed to control the shared data bus. To accommodate operation of multiple master devices in such bus architectures, a mechanism is provided for a new master device to trigger an IRQ signal over a shared, single line interrupt (IRQ) bus. The current master device then polls the other master devices over the shared data bus to ascertain which master device is asserting the IRQ signal. Upon identifying the asserting master device, the current master device grants control of the data bus to the new master device.

According to one aspect, the other master devices may operate in master mode only. According to a second aspect, the other master devices may be slave devices that are able to switch to master device operation by requesting use of the data bus from a current master device of the data bus.

Exemplary Method for Transferring Master Authority

Figure 1:
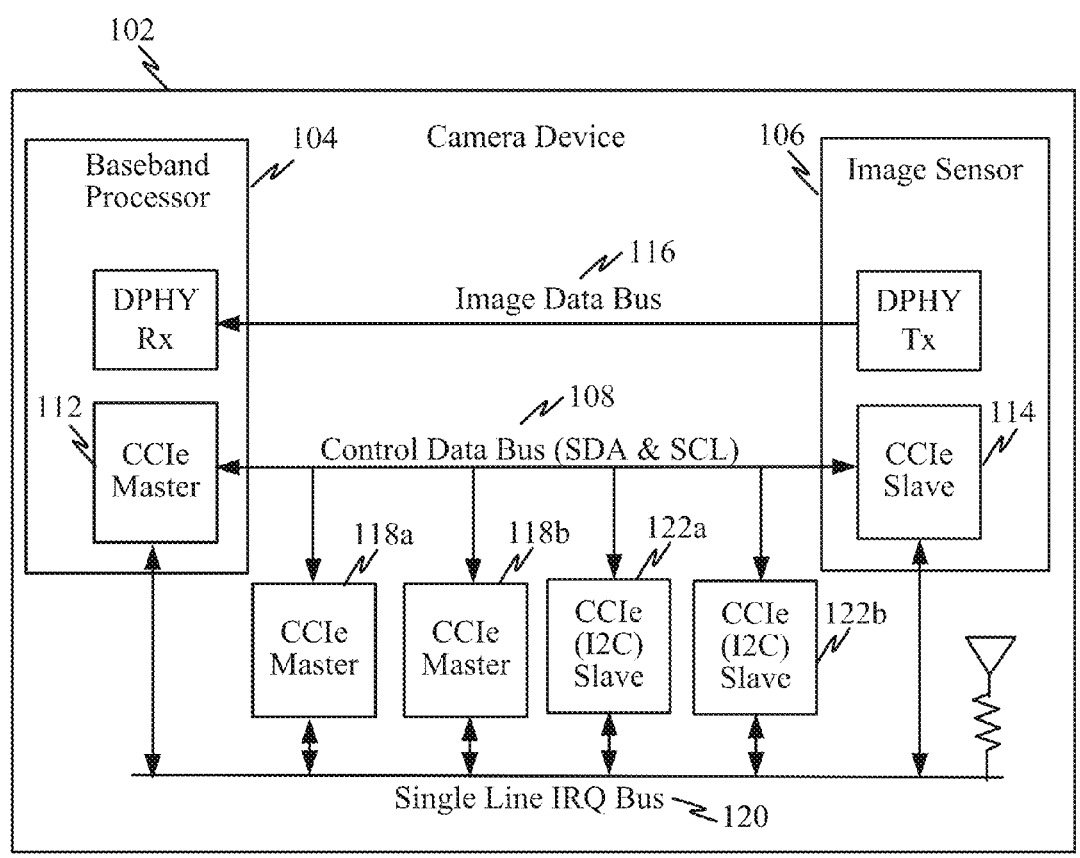
FIG. 1 is a block diagram illustrating a device having a baseband processor and an image sensor and implementing an image data bus and a control data bus.

FIG. 1 is a block diagram illustrating a device 102 having a baseband processor 104 and an image sensor 106 and implementing an image data bus 116 and a control data bus 108 (e.g., I2C bus). While FIG. 1 illustrates the control data bus 108 within a camera device, it should be clear that this control data bus 108 may be implemented in various different devices and/or systems. Image data may be sent from the image sensor 106 to the baseband processor 104 over an image data bus 116 (e.g., a high speed differential DPHY link). In one example, the control data bus 108 may comprise two wires, a clock line (SCL) and a serial data line (SDA). The data line SDA and clock line SCL may be coupled to all devices 112, 114, 118, and 122 on the control data bus 108.

In this example, a CCIe master 112 is an active master coupled to a CCIe slave 114, a plurality of inactive masters 118a and 118b, and a plurality of CCIe (I2C) slaves 122a and 122b. The control data bus 108 architecture allows for only one active master at a time. Additionally, the master(s) 112, 118 and slaves 114 and 122 may be coupled to a shared single-line IRQ bus 120.

The inactive CCIe masters 118a and 118b may, in one implementation, be configured to operate solely as masters (e.g., they cannot operate as slaves). Generally, a "master" is a device coupled to the control data bus 108 and manages communications (from other devices) over the control data bus 108. In order to become an active master, the inactive masters may be given control (e.g., one at a time) over the control data bus 108 by a current master. For example, if the inactive master 118a desires to be active, the inactive master 118a asserts an IRQ signal on the IRQ bus 120 (e.g., by pulling down the single line shared IRQ bus 120). The currently active master 112 receives the interrupt signal and then polls/scans all devices coupled to the control bus 108 to determine which device asserted the interrupt and for what reason. For example, a slave 114 may request temporary use of the control bus 108. Additionally, an inactive master 118a and/or 118b may make a master request. That is, the inactive master 118a and/or 118b makes a request to take over and control the control bus 108 for more than a temporary time. Typically, the newly active master controls the control data bus 108 indefinitely or until another inactive master seeks control. According to one aspect, the shared single line IRQ bus 120 is coupled to the slave devices 114, 122a, and 122b as well as to the master devices 112, 118a, and 118b. This shared IRQ line 120 may be pulled up (e.g., pull high) and may be pulled low when a slave device asserts an IRQ signal. That is, each slave device 114, 122a, and 122b may independently request access to transmit on the control data bus 108 by sending an IRQ signal (e.g., request) to the master device 112.

Control data may be exchanged between the baseband processor 104 and the image sensor 106 as well as other peripheral devices 114, 122a, and 122b (slave devices) via the control data bus 108.

In some examples, the single line IRQ bus may be an asynchronous bus (e.g., unmanaged by a master device or any other device). This means that the slave devices can unilaterally assert an IRQ signal at any time. In another example, the single line IRQ bus may be dedicated to unidirectional signal transmissions from slave devices to the master devices. That is, the single line IRQ bus may be used for only IRQ signals and no other types of signals. In one example, the control data bus 108 may be a camera control interface (CCI) or CCI extension compatible bus. In another example, the control data bus may be a bidirectional bus between the slave devices and the master device.

According to one aspect, an improved mode of operation (i.e., greater than 1 MHz) may be implemented over the multi-mode control data bus 108 to support camera operation. This improved mode of operation over an I2C bus may be referred to as a camera control interface extension (CCIe) mode when used for camera applications. In this example, the baseband processor 104 includes a master node 112 and the image sensor 106 includes a slave node 114, both the master node 112 and slave node 114 may operate according to the camera control interface extension (CCIe) mode over the control data bus 108 without affecting the proper operation of other legacy I2C devices, such as slaves 122a and 122b, coupled to the control data bus 108. According to one aspect, this improved mode over the control data bus 108 may be implemented without any bridge device between CCIe devices and any legacy I2C slave devices 122a and 122b. According to one aspect, legacy I2C devices 122a and 122b may operate in a first mode having a first clock, first bus speed, and/or first signal protocol, while CCIe-capable devices may operate in a second mode having a second clock, second bus speed, and/or second protocol. The first clock, first bus speed, and/or first signal protocol may be distinct from the second clock, second bus speed, and/or second protocol. For example, the second clock and/or second bus speed may be faster or have greater speed than the first clock and/or first bus speed, respectively.

According to one aspect, all slave devices 114, 122a, and 122b may be CCIe-capable devices so that there is no need to switch between the first mode and second mode of operation. That is, all signaling and/or communications over may be performed according to the second mode (e.g., at a second clock, second bus speed, and/or a second protocol). For example, because the second mode may provide a greater bit rate than the first rate, there is no need to switch back and forth between the first mode and second mode. In fact, because legacy devices compatible with the first mode need not be accommodated, a third mode of operation may be implemented that provides a higher/greater bit rate than the second mode.

Figure 2:
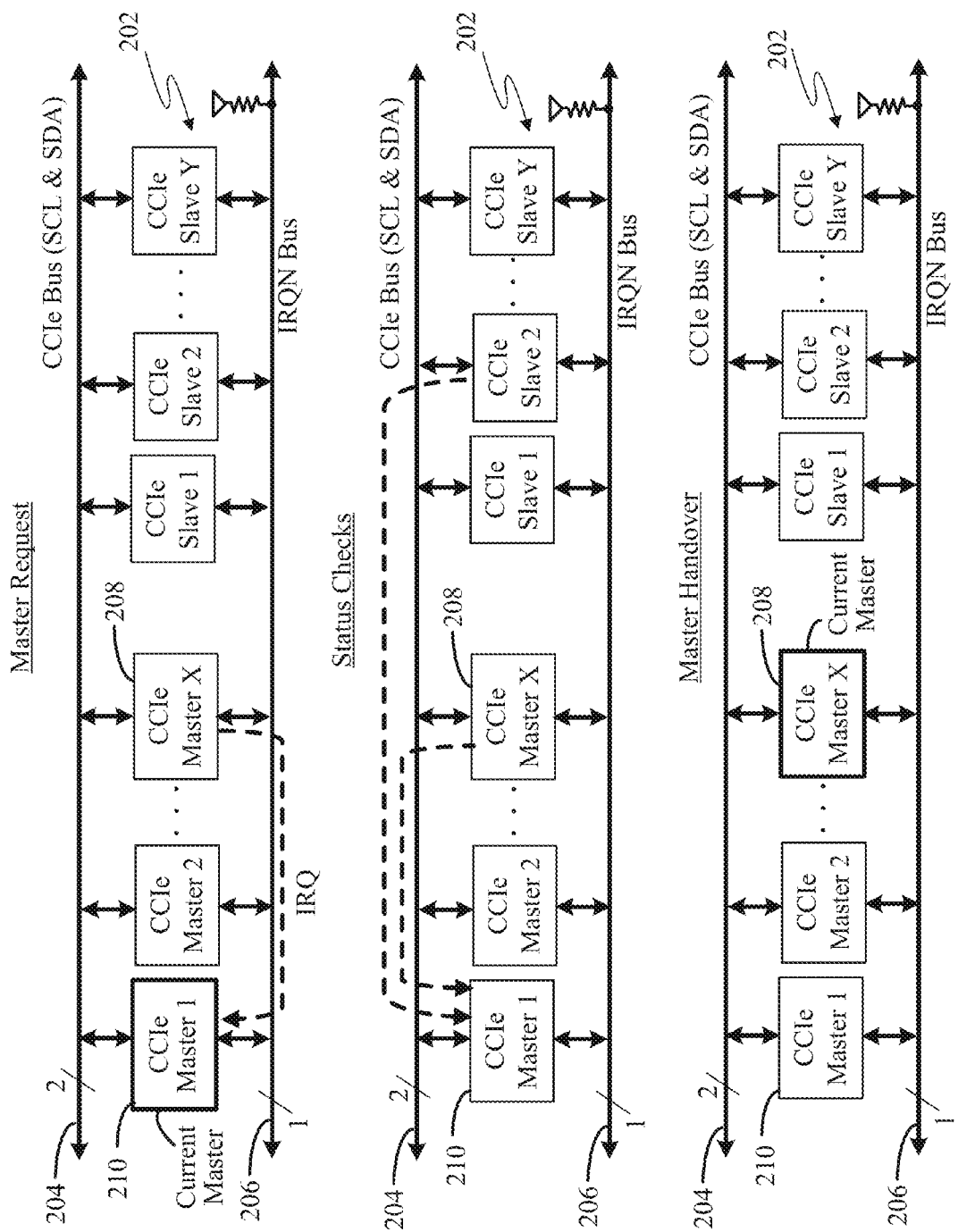
FIG. 2 illustrates a master request and handover operation in a system including a plurality of master and/or slave devices coupled to a CCIe bus and an interrupt (IRQ) bus.

FIG. 2 illustrates a master request and handover operation in a system including a plurality of master and/or slave devices 202 coupled to a CCIe bus 204 (e.g., a control data bus) and an IRQ bus 206. An inactive master X 208 asserts an interrupt signal on the IRQ bus 206. The currently active master 1 210 (the current master) receives the asserted interrupt signal. Master 1 210 polls each inactive master over the CCIe bus 204 to ascertain which device asserted the IRQ signal. Upon identifying the asserting master, the currently active master 206 relinquishes control of the CCIe bus 204 and the asserting inactive master 208 becomes the new currently active master.

In one example, such polling of inactive masters to ascertain the asserting master may check (e.g., request to read) one or more status registers within each inactive master being polled. In one example, such status registers may indicate whether a device triggered/asserted an IRQ signal and/or if such assertion is for a master request (e.g., request to become a master of the control data bus). In one example, conveying such status register (or other information over the CCIe bus) indicating a master request to a current master by an inactive master (after asserting an IRQ signal) may be sufficient for the inactive master to take control of the CCIe bus 204. In other implementations, the inactive master (e.g., after being polled by the currently active master) may receive an additional message from the currently active master indicating that it now has control of the CCIe bus and should become the active master.

In some implementations, like CCI and CCIe, a specific mechanism to indicate whether a master request is being asserted may not be available (e.g., since status registers were not intended to support multiple masters). Consequently, a way is needed to permit an inactive master to indicate it wishes to take control of the CCIe bus 204 as its new master.

According to a first feature, a spare bit is available because only 19 bits out of 20 bits are used for data. This spare bit may be used to indicate a master request.

A typical I2C bus includes a serial clock (SCL) line and serial data (SDA) line. However, according to one feature, the CCIe bus 204 may reuse these two lines for coded data transmissions in which the clock is embedded within symbol transmissions.

Figure 3:
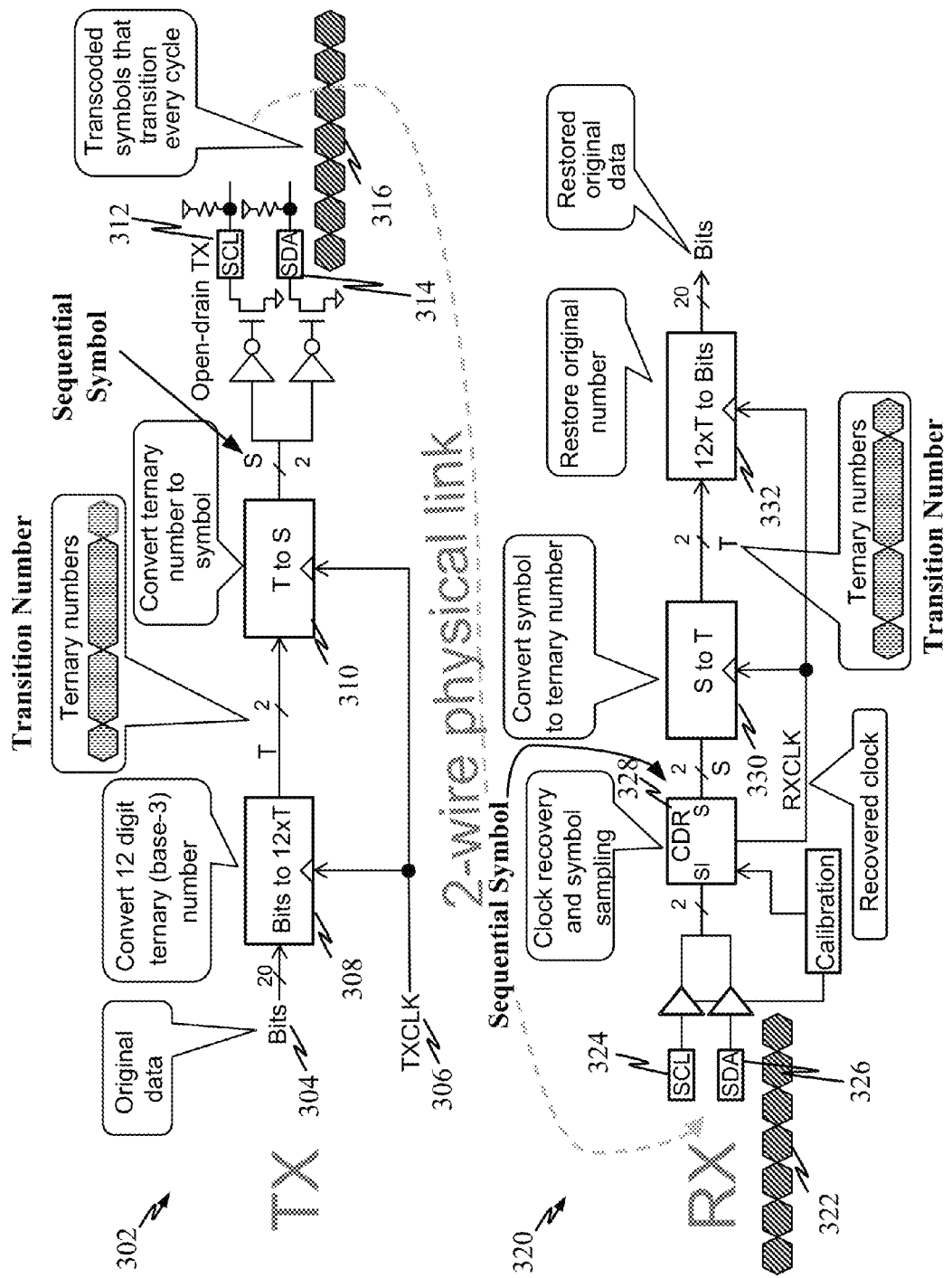
FIG. 3 is a block diagram illustrating an exemplary method for transcoding of data bits into transcoded symbols at a transmitter to embed a clock signal within the transcoded symbols.

FIG. 3 is a block diagram illustrating an exemplary method for transcoding of data bits into transcoded symbols at a transmitter to embed a clock signal within the transcoded symbols. At the transmitter 302, a sequence of data bits 304 are converted into a ternary (base 3) number (i.e., a "transition number"), and the ternary numbers are then converted into (sequential) symbols which are transmitted over the clock line SCL 312 and the data line SDA 314. In one example, an original 20-bits of binary data is input to a bit-to-transition number converter block 308 to be converted to a 12-digit ternary number. Each digit of the 12-digit ternary number may represent a "transition number". Two consecutive transition numbers may have the same digit. Each transition number is converted into a sequential symbol at a transition-to-symbol block 310 such that no two consecutive sequential symbols have the same values. Because a transition is guaranteed at every sequential symbol, such sequential symbol transition may serve to embed a clock signal. Each sequential symbol 316 is then sent over a two wire physical link (e.g., I2C bus comprising a SCL line 312 and a SDA line 314).

Figure 4:
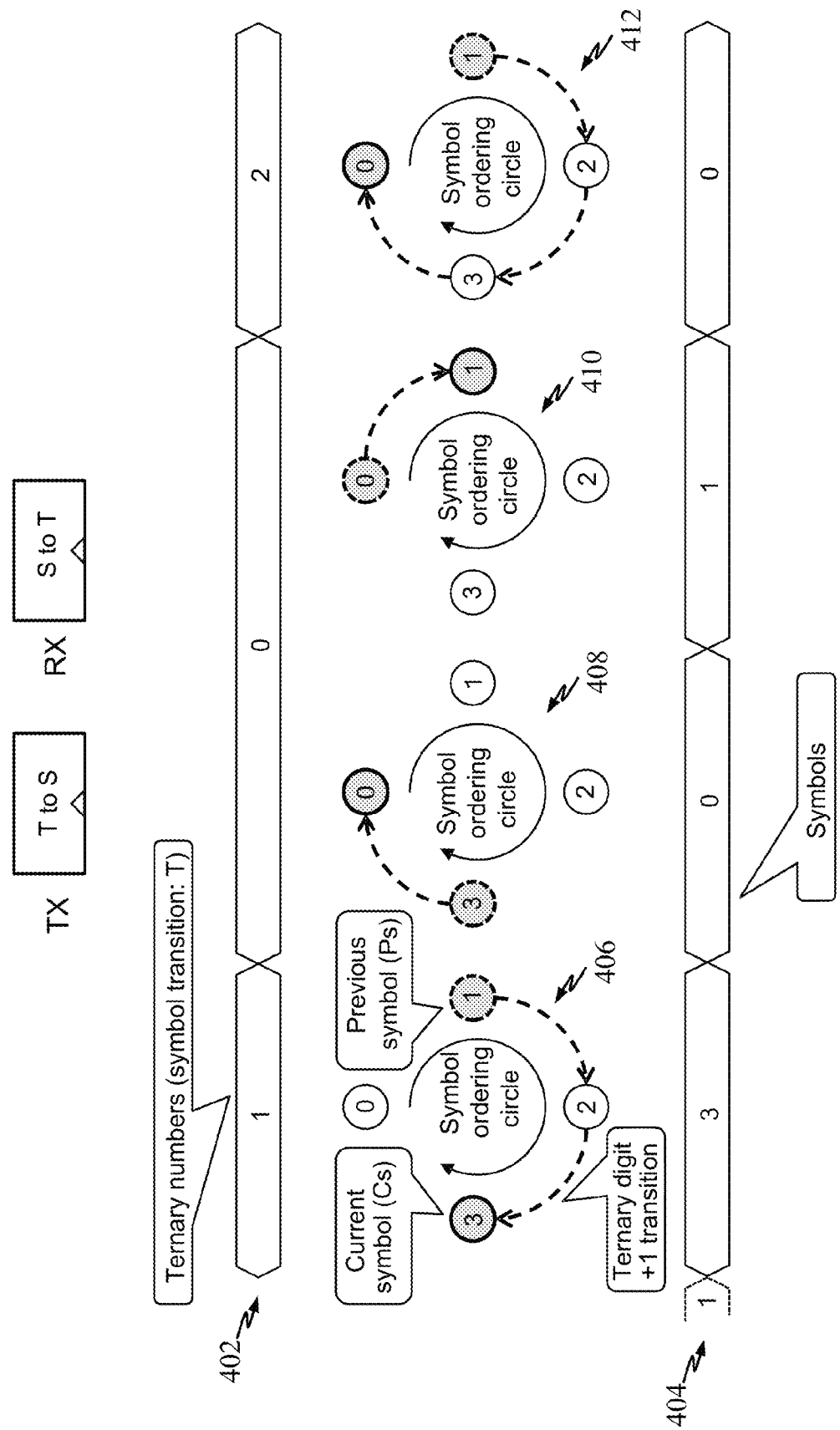
FIG. 4 illustrates one example of converting between ternary numbers (transition number) and (sequential) symbols.

FIG. 4 illustrates one example of converting between ternary numbers (transition number) 402 and (sequential) symbols 404. A ternary number, base-3 number, also referred to as a transition number, can have one of the three possible digits or states, 0, 1, or 2. While the same value may appear in two consecutive digits of a ternary number, no two consecutive symbols have the same value.

The conversion function adds the transition number plus 1 to the previous raw symbol value. If the addition results in a number larger than 3, it rolls over from 0, then the result becomes the state number for the current symbol.

In a first cycle 406, a previous symbol is 1 when first transition number 1 is input, so transition number 1 plus 1 is added to the previous symbol, and the result 3 becomes the current symbol state that is sent to the physical link.

In a second cycle 408, the transition number 0 is input in the next cycle, and transition number 0 plus 1 is added to the previous symbol 3. Since the result of the addition, 4, is larger than 3, the rolled over number 0 becomes the current symbol.

In a third cycle 410, the same transition number 0 is input. The conversion logic adds 1 to the previous symbol 0 to generate current symbol 1.

In a fourth cycle 412, the transition number 2 is input. The conversion logic adds the transition number 2 plus 1 to the previous symbol 1 to generate current symbol 0 (since the result of the addition, 4, is larger than 3, the rolled over number 0 becomes the current symbol).

Consequently, even if two consecutive ternary digits 402 have the same numbers, this conversion guarantees that two consecutive symbol numbers have different state values. Because of this, the guaranteed symbol transition in the sequence of symbols 404 may serve to embed a clock signal, thereby freeing the clock line SCL in an I2C bus for data transmissions.

Referring again to FIG. 3, at the receiver 320 the process is reversed to convert the transcoded symbols back to bits and, in the process, a clock signal is extracted from the symbol transition. The receiver 320 receives a sequence of sequential symbols 322 over the two wire physical link (e.g., I2C bus comprising a SCL line 324 and a SDA line 326). The received sequential symbols 322 are input into a clock-data recovery (CDR) block 328 to recover a clock timing and sample the transcoded symbols (S). A symbol-to-transition number converter block 330 then converts the transcoded (sequential) symbols to a transition number, i.e., one ternary digit number. In this example, a transition number-to-bits converter 332 converts 12 transition numbers to restore 20 bits of original data from the 12 digit ternary number.

This technique illustrated herein may be used to increase the link rate of a control bus 108 (FIG. 1) or 204 (FIG. 2) beyond what the I2C standard bus provides and is referred hereto as CCIe mode. In one example, a master node and/or a slave node coupled to the control data bus 108 may implement transmitters and/or receivers that embed a clock signal within symbol transmissions (as illustrated in FIG. 3) in order to achieve higher bit rates over the same control data bus than is possible using a standard I2C bus.

Figure 5:
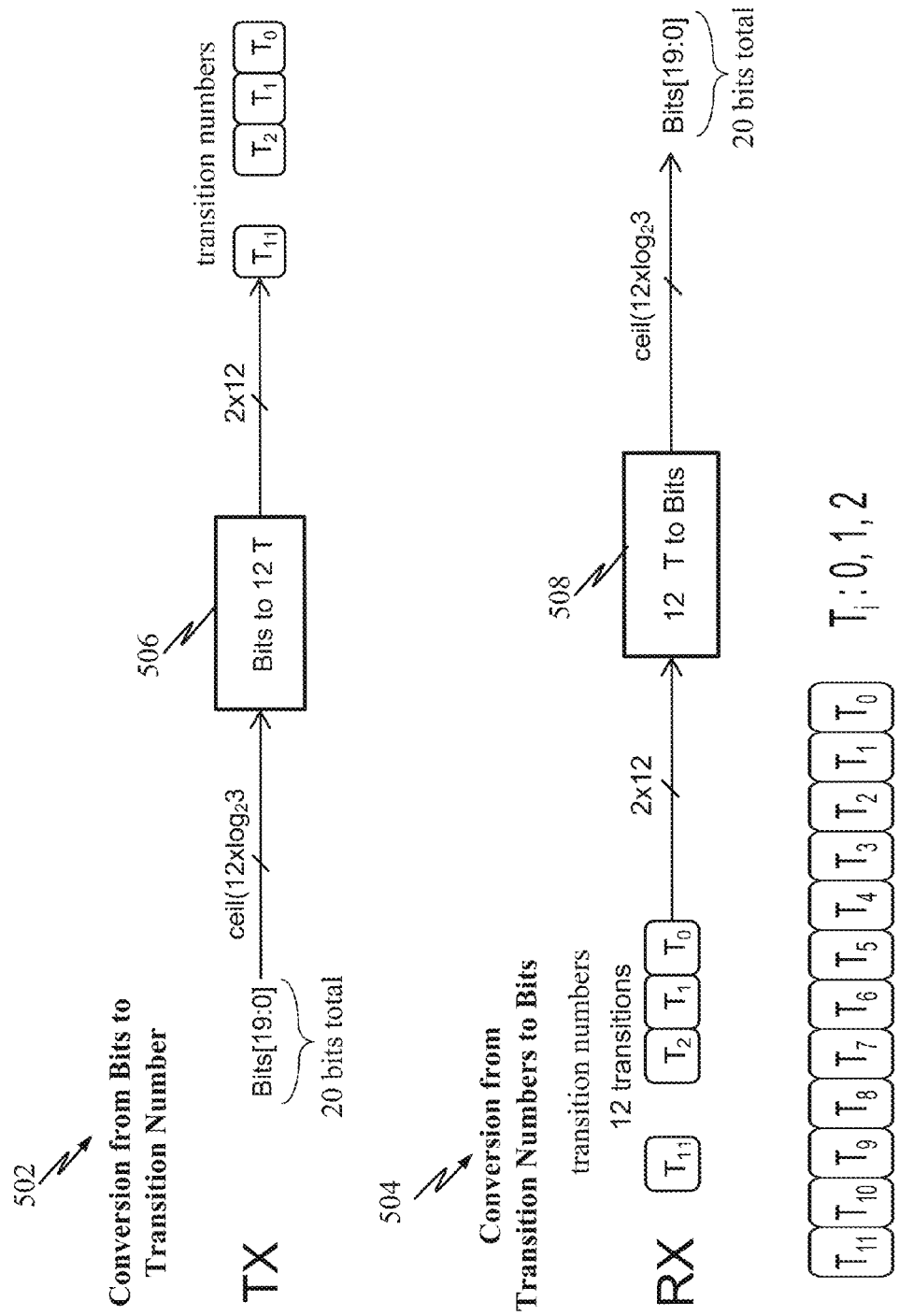
FIG. 5 illustrates an exemplary conversion from bits to transition numbers at a transmitter and then from transition numbers to bits at a receiver.

FIG. 5 illustrates an exemplary conversion from bits to transition numbers at a transmitter 502 and then from transition numbers to bits at a receiver 504. This example illustrates the transmission for a 2-wire system using 12 transition symbols. The transmitter 502 feeds binary information, Bits, into a "Bits to 12×T" converter 506 to generate 12 symbol transition numbers, T0 to T11. The receiver 504 receives 12 symbols transition numbers, T0 to T11, which are fed into a "12×T to Bits" converter 508 to retrieve the binary information (Bits). If there are r possible symbol transition states per one T, T0 to T11, 12 transitions can send $r^{12}$ different states. For a 2-wire bus, $r=2^2-1$. Consequently, transitions T0 ... T11 contain data that can have $(2^2-1)^{12}$ different states. Consequently, $r=4-1=3$ and the number of states $=(4-1)^{12}=531441$.

In this example for 2-wire system using 12 symbol transition numbers, it may be assumed the possible symbol transitions per one T, r is 3 ($=2^2-1$). If the number of symbols in a group 12, a 12-digit ternary number (base-3 number): T11, T10, ..., T2, T1, T0, where each Ti: 0, 1, 2, may be used. For example, for {T11, T10, ... T2, T1, T0}={2, 1, 0, 0, 1, 1, 0, 1,0, 1, 2, 1}, the ternary number is:

$$2100\_1101\_0121_3 = 2\times 3^{11} + 1\times 3^{10} + 0\times 3^9 + 0\times 3^8 +$$ (Ternary number)
$$1\times 3^7 + 1\times 3^6 + 0\times 3^5 + 1\times 3^4 +$$
$$0\times 3^3 + 1\times 3^2 + 2\times 3^1 + 1\times 3^0$$
$$= 416356\, (0\times 65A64).$$

In this manner, 12 transitions numbers may be converted into a number. Note that the ternary number $2100{,}1101{,}0121_3$ may be used as the transition number, for example, in FIG. 3, so that each integer may be mapped to a sequential symbol and vice versa.

The example illustrated for a 2-wire system and 12 symbol transition numbers may be generalized to an n-wire system and m symbol transition numbers. If there are r possible symbol transition states per one T, T0 to Tm−1, m transitions can send $r^m$ different states, i.e., $r=2^n-1$. Consequently, transitions T0 ... Tm−1 contain data that can have $(2^n-1)^m$ different states.

Figure 6:
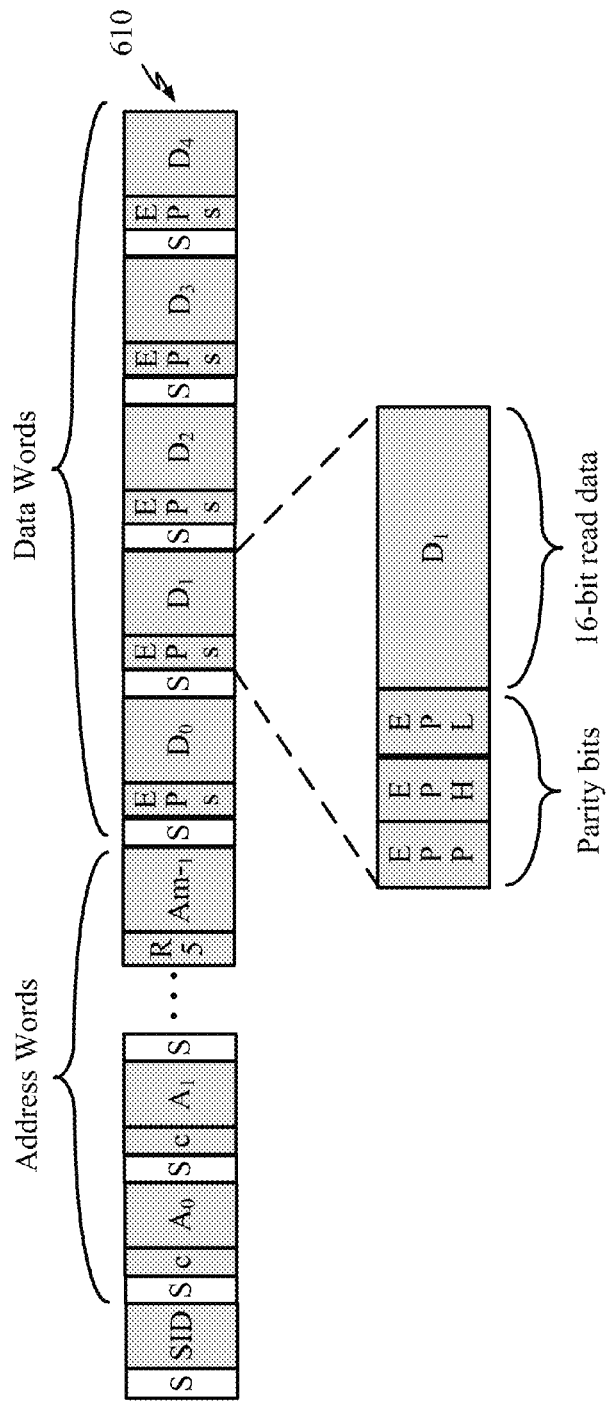
FIG. 6 illustrates a data word where 16 bits, (0 to 15) are read data and 3 bits are parity bits (16-18).

FIG. 6 illustrates a data word 610 where 16 bits, (bits 0 to 15) are read data and 3 bits are parity bits (16-18). In other words, a read data word may consist of a 16-bit read data value and 3-bit parity bits. There will be a subsequent address word when the control code of the current address word is from '000' (C0) to '101 (C5). The next write address is the address of current data plus a control data value. A control code of '111' is illegal because it is reserved for a SID marker. Next word is a SID (slave ID) or an Exit code if the control code is '110' (E). Not shown in FIG. 6 is that the data word 610 can have a spare bit (e.g., the $20^{th}$ bit or also referred to a "bit 19" when the bit count starts at the $0^{th}$ bit) used to indicate an inactive master device attempting to become an active master device as described herein. The transcoding scheme illustrated in FIGS. 3-5 shows that 19 bits (which may be referred to a bits 0-18) may be utilized by the data word 610 may be coded for transmission over the CCIe bus 204 (FIG. 2). But the transcoding scheme can effectively transmit at least 20 bits within the 12-digit ternary number. When bit 19 is set, bits 13-18 are always 0, and bits [12:0] can represent only from 0x0000 up to 0x1BF0. Consequently, bit 19 ($20^{th}$ bit) may be used by an inactive master to indicate a master request.

Figure 7:
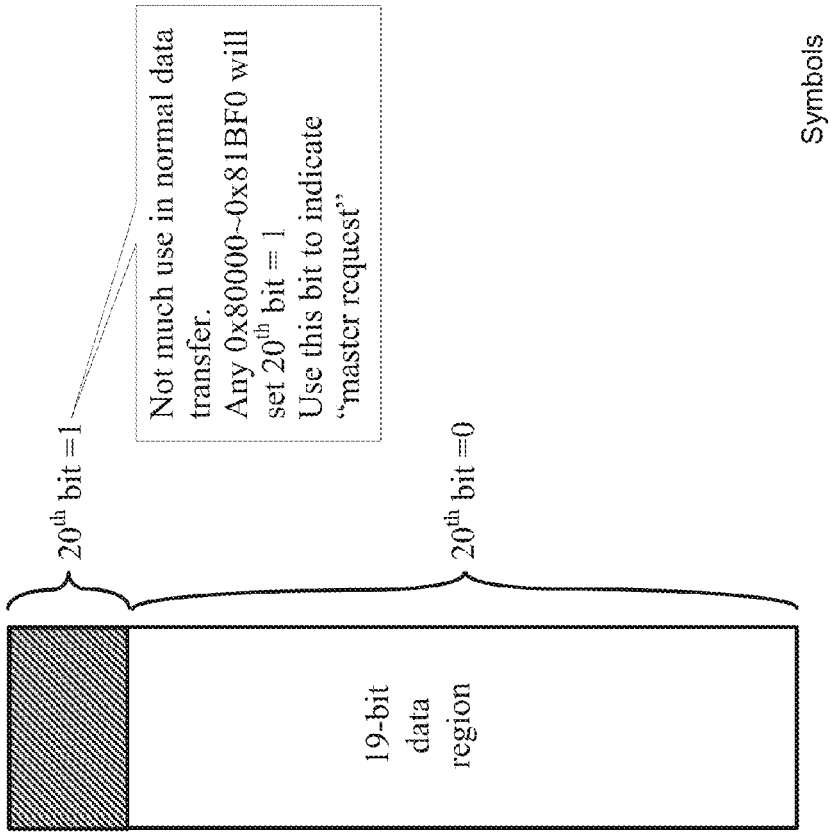
FIG. 7 illustrates the availability of an extra ($20^{th}$) bit resulting from the encoding scheme illustrated in FIGS. 3, 4, and 5.

FIG. 7 illustrates the availability of an extra ($20^{th}$) bit resulting from the encoding scheme illustrated in FIGS. 3, 4, and 5. As is typical in the computer sciences, counting bit wise begins at zero, a $20^{th}$ bit is often referred to as bit 19. Here, the bits 0-18 are represented within the ternary number range of $0000\_0000\_0000_3$ to $2221\_2201\_2001_3$. The ternary numbers in the range of $2221\_2201\_2002_3$ to $2222\_2222\_2222_3$ are unused. Consequently, the ternary number range $2221\_2201\_2002_3$ to $2222\_222\_2222_3$ may be used to represent bit 19 (i.e., 20th bit). In other words, $2221\_2201\_2002_3$ ternary is 1000_0000_0000_0000_0000 binary (0x80000 hexadecimal) and $2222\_2222\_2222_3$ ternary (0x81BF0) is the largest 12 digit ternary number possible. In one implementation of a master request, the $20^{th}$ bit (bit 19) is set to 1 by an asserting inactive master.

Figure 8:
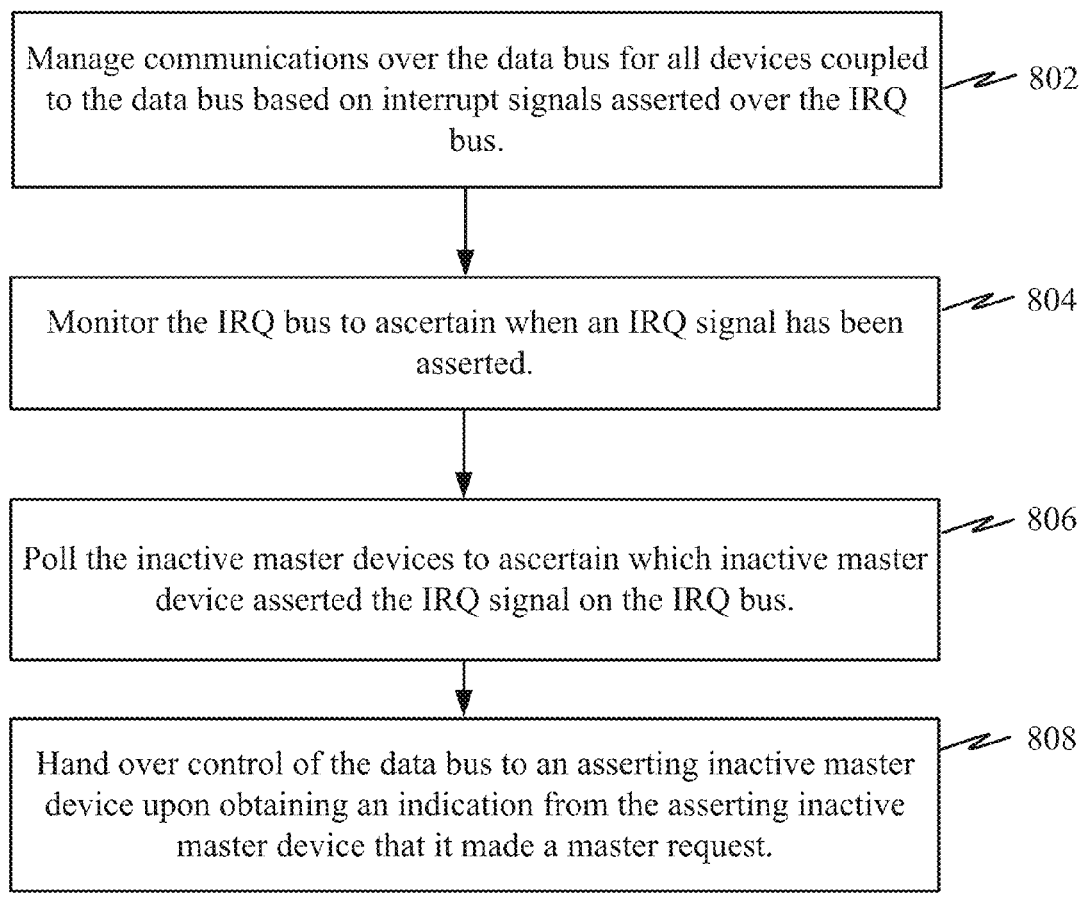
FIG. 8 illustrates a method including grouping a plurality of devices coupled to a shared single line interrupt request (IRQ) bus into two or more groups, where each group is associated with a different IRQ signal.

FIG. 8 illustrates a method for an active master device to transfer control of a data bus to an inactive master device. The active master device may be coupled to a control data bus and a shared single line interrupt (IRQ) bus. A plurality of inactive master devices and/or slave devices may also be coupled to the control data bus and shared single line interrupt bus. The active master device may manage communications over the data bus for all devices coupled to the data bus based on interrupt signals asserted over the IRQ bus. The active master device may monitor the IRQ bus to ascertain when an IRQ signal has been asserted 804. The master device may then poll the inactive master devices to ascertain which inactive master device asserted the IRQ signal on the IRQ bus 806. Upon obtaining an indication from one of the inactive master devices that it made a master request, the active master hands over control of the data bus to the asserting inactive master device 808.

Figure 9:
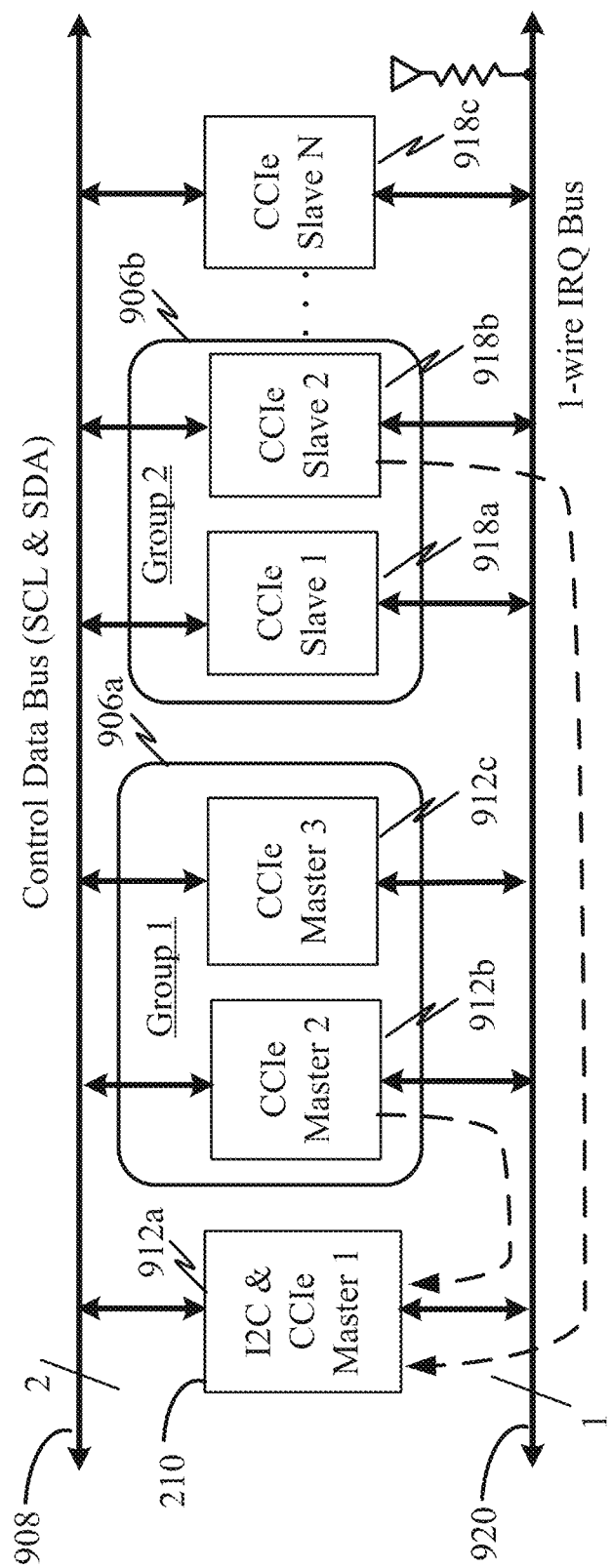
FIG. 9 is a block diagram illustrating how a single wire IRQ bus may be shared by a plurality of slave devices and one or more master device(s).

FIG. 9 is a block diagram illustrating how a single wire IRQ bus 920 may be shared by a plurality of slave devices 918a-c and one or more master device(s) 912a-c, and wherein the requesting and transferring of master control as shown in FIG. 2 can be implemented. In this example, the slave devices 918a-c and master devices 912a-c may be logically grouped (e.g., Group-1 906a, Group-2 906b, etc.). Such groupings may be, for example, pre-configured or dynamically defined (e.g., by enumeration) upon boot-up by the active master 1 device 912a, wherein master devices 2 and 3 912b-c are inactive. Such groupings allow the master device 912a to more quickly identify which slave device and/or inactive master device triggered an IRQ signal on the IRQ bus 920 without unacceptable delays.

Figure 10:
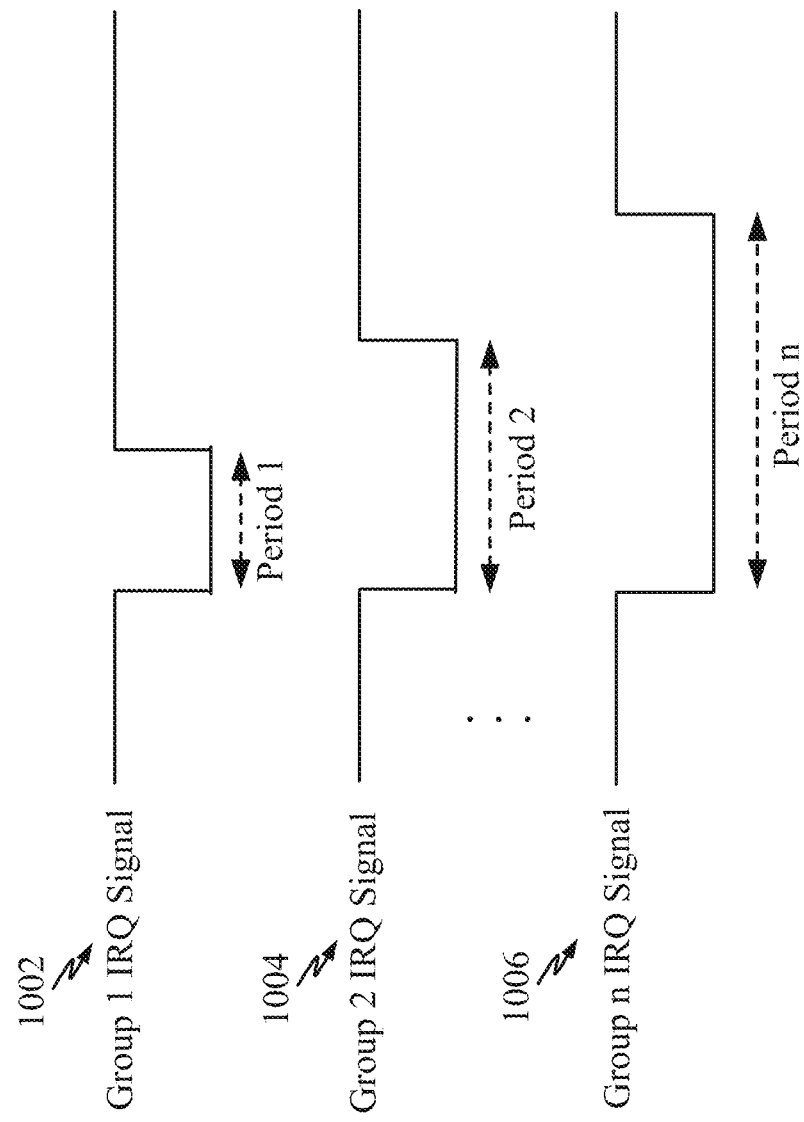
FIG. 10 illustrates examples of different IRQ signals that may be assigned or associated with different groups.

Each group of devices 906a and 906b may have a distinct IRQ signal (e.g., illustrated in FIG. 10). For instance, a first group 906a may use a first signal having a first period, a second group 906b may use a second signal having a second period, and so on. For example, the "period" may be a length of time for which the IRQ bus 920 is pulled low by the asserting slave device. Note that other forms of signal differentiation may be used, e.g., different voltage levels for the IRQ signals used by different groups of slave devices, etc. In one implementation, a "group" of devices may define a logical group, such that each "group" may include a single device. In other implementations, each "group" may include 2, 3, and/or 4 devices or more. The number of slave devices or master devices per group may be a function of how long it would take to query and identify an asserting device. For instance, if all devices coupled to the IRQ bus 920 have to be queried by the active master device 912a, this may cause an unacceptably long delay. Consequently, grouping devices and using distinct IRQ signals for each group allows the master device 912a to identify an asserting device that has its bit 19 set to indicate a master request. Additionally, although shown as inactive masters grouped together 906a and slaves grouped together 906b, inactive masters and slaves can be grouped together.

The master device 912a detects the occurrence of an IRQ signal on the shared single line IRQ bus 920 and queries each device in the group to identify which device triggered or asserted the IRQ signal. For example, if the IRQ signal identifies a group-2 906b slave device, then the active master device 912a may send a register status request (via the control data bus 908) to a first slave device 918a within group-2.

If the first slave device 918a status response indicates that it is not the asserting slave device, then the master device 912a may send another register status request (via the control data bus 908) to a second slave device 918b within group-2. This process is repeated for all slave devices in group-2 906b until the slave device that asserted the IRQ signal is identified (in one implementation where a slave is capable of being a master). This process is repeated for all slave devices in group-2 906b until the slave device that asserted the IRQ signal is identified. This is one method to scan IRQ status from a group, where scanning stops when a first requesting slave is found (e.g., even if there may be more requesting slaves in the group). When this method is used, the master must indicate or globally notify that it serves only the request from the first requesting slave, so that those slaves not being serviced can know that they will have to reissue IRQs to be serviced.

Another method to scan for IRQ status from a group is to scan all the slaves in the group (and continue scanning even after detecting a first requesting slave) and keep a list of all requesting slaves. This way, the currently active master may find multiple requesting slaves and service all requests without having the slaves reissue IRQs.

Similarly, the active master 912a can be signaled from one of the inactive masters 912b-c. For example, if the IRQ signal identifies a group-1 906a, then the active master device 912a may send a register status request (via the control data bus 908) to a the first inactive master device 912b within group-1.

If the first inactive master device 912b status response indicates that it is not the asserting inactive master device, then the active master device 912a may send another register status request (via the control data bus 908) to a second inactive master device 912c within group-1. This process is repeated for all inactive master devices in group-1 906a until the inactive master device that asserted the IRQ signal is identified. Moreover, when the inactive master device has its IRQ status register's bit 19 set, then the current master makes that inactive master active. As used herein the term active master means actively controlling the control data bus. In addition, an inactive master can be doing internal activities as well as external activities, however the inactive master does not have current control over the control data bus. Therefore, inactive does not mean no activity, rather it only means that the device it is not actively controlling or managing communications or use of the control data bus at that moment.

FIG. 10 illustrates examples of different IRQ signals that may be assigned or associated with different groups. This example illustrates a first IRQ signal 1002 having a first period, a second IRQ signal 1004 having a second period, and a third IRQ signal 1006 having a third period. Additionally, any method of differentiating the different groups can be employed to identify the group sending the interrupt request. In one example, a particular signal may be assigned to all inactive master devices and may be used to indicate a master request over the IRQ bus.

Figure 11:
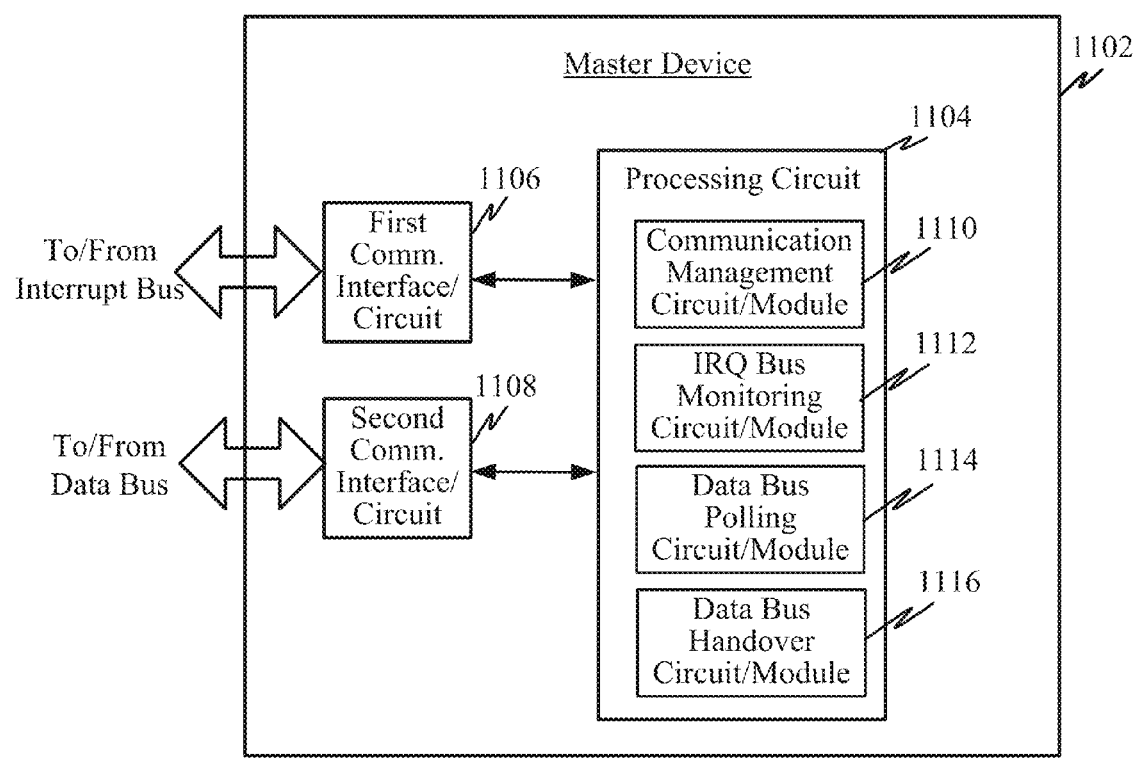
FIG. 11 is a block diagram illustrating an exemplary master device adapted for multi-master operation over a single-master bus.

FIG. 11 is a block diagram illustrating an exemplary master device adapted for multi-master operation over a single-master bus. The master device 1102 may include a first communication interface/circuit 1106, a second communication interface/circuit 1108, and/or a processing circuit 1104. The first communication interface/circuit 1106 may serve to couple to a single line interrupt request (IRQ) bus to which a plurality of other devices may be coupled. The second communication interface/circuit 1108 may serve to couple to a data bus to which the plurality of other devices may also be coupled.

The processing circuit 1104 may include various sub-circuits and/or modules to carry out one or more functions described herein. For example, a communication management circuit/module 1110 may be adapted to manage communications over the data bus for all devices coupled to the data bus based on interrupt signals asserted over the IRQ bus. An IRQ bus monitoring circuit/module 1112 may be adapted to monitor the IRQ bus to ascertain when an IRQ signal has been asserted. A data bus polling circuit/module 1114 may be adapted to poll the inactive master devices over the data bus to ascertain which inactive master device asserted the IRQ signal on the IRQ bus. A data bus handover circuit/module 1116 may be adapted to hand over control of the data bus to an asserting inactive master device upon obtaining an indication from the inactive master device that it made a master request. In one example, the master request from the inactive master device may be obtained over the first interface. The indication from the inactive master device may be obtained over the second interface. In various examples, the data bus may be a camera control interface extension (CCIe)-compatible bus and/or a bidirectional bus.

In some implementations, the processing circuit may be further adapted to identify the asserting inactive master device with which the IRQ signal is associated based on the obtained indicator. For instance, if the indicator from each inactive master device has a difference pulse width, then this may be sufficient to identify the asserting inactive master.

In other implementations, the processing circuit may be further adapted to identify a group of devices with which the IRQ signal is associated. For instance, each group of devices may include a single device or a plurality of devices. Where a group includes a plurality of devices, the processing circuit may be further adapted to scan the devices for the identified group to ascertain which device asserted the IRQ signal on the IRQ bus. The IRQ signal associated with each group may have a different pulse width than other IRQ signals associated with other groups.

The processing circuit may be further adapted to: (a) ascertain if a polled inactive master device asserted the IRQ signal and made the master request by looking at a particular bit in a status register obtained from each of the polled inactive master devices, and/or (b) send an indicator to the asserting inactive master device over the data bus to transfer control of the data bus.

One or more of the components, steps, features, and/or functions illustrated in the Figures may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in the Figures may be configured to perform one or more of the methods, features, or steps described in the Figures. The novel algorithms described herein may also be efficiently implemented in software and/or embedded in hardware.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices, and/or other machine readable mediums for storing information. The term "machine readable medium" includes, but is not limited to portable or fixed storage devices, optical storage devices, wireless channels and various other mediums capable of storing, containing, or carrying instruction(s) and/or data.

Furthermore, embodiments may be implemented by hardware, software, firmware, middleware, microcode, or any combination thereof When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A device, comprising:
a single line interrupt request (IRQ) bus to which a plurality of master devices are coupled, wherein the plurality of master devices include an active master device and one or more inactive master devices;
a data bus to which the plurality of master devices are also coupled;
a processing circuit within the active master device, the processing circuit adapted to:
manage communications over the data bus for all devices coupled to the data bus based on interrupt signals asserted over the IRQ bus;
monitor the IRQ bus to ascertain when an IRQ signal has been asserted;
poll the inactive master devices over the data bus to ascertain which inactive master device asserted the IRQ signal on the IRQ bus; and
hand over control of the data bus to an asserting inactive master device upon obtaining an indication from the inactive master device that it made a master request.

2. The device of claim 1, wherein the master request from the inactive master device is obtained over the IRQ bus.

3. The device of claim 1, wherein the indication from the inactive master device is obtained over the data bus.

4. The device of claim 1, wherein the processing circuit is further adapted to:
send an indicator to the asserting inactive master device to transfer control of the data bus.

5. The device of claim 1, wherein the processing circuit is further adapted to:
identify the asserting inactive master device with which the IRQ signal is associated based on the obtained indicator.

6. The device of claim 1, wherein the processing circuit is further adapted to:
identify a group of devices with which the IRQ signal is associated.

7. The device of claim 6, wherein the processing circuit is further adapted to:
scan the devices for the identified group to ascertain which device asserted the IRQ signal on the IRQ bus.

8. The device of claim 6, wherein the IRQ signal associated with each group has a different pulse width than other IRQ signals associated with other groups.

9. The device of claim 6, wherein each group of devices includes a single device.

10. The device of claim 1, wherein the processing circuit is further adapted to:
ascertain if a polled inactive master device asserted the IRQ signal and made the master request by looking at a particular bit in a status register obtained from each of the polled inactive master devices.

11. The device of claim 1, wherein the indication from the inactive master device that it made a master request is encoded within an unused bit obtained by coding the transmissions from the one or more inactive master devices to the active master device.

12. The device of claim 1, wherein at least the asserting inactive master device switches between a master mode of operation and a slave mode of operation.

13. A method operational on a device, comprising:
managing communications over a data bus for all devices coupled to the data bus based on interrupt signals asserted over a single line interrupt request (IRQ) bus, wherein a plurality of master devices are coupled to IRQ bus and the data bus;
monitoring the IRQ bus to ascertain when an IRQ signal has been asserted;
polling the inactive master devices over the data bus to ascertain which inactive master device asserted the IRQ signal on the IRQ bus; and
handing over control of the data bus to an asserting inactive master device upon obtaining an indication from the inactive master device that it made a master request.

14. The method of claim 13, further comprising:
sending an indicator to the asserting inactive master device to transfer control of the data bus.

15. The method of claim 13, further comprising:
identifying the asserting inactive master device with which the IRQ signal is associated based on the obtained indicator.

16. The method of claim 13, further comprising:
identifying a group of devices with which the IRQ signal is associated.

17. The method of claim 16, further comprising:
scanning the devices for the identified group to ascertain which device asserted the IRQ signal on the IRQ bus.

18. The method of claim 16, wherein the IRQ signal associated with each group has a different pulse width than other IRQ signals associated with other groups.

19. The method of claim 13, further comprising:
ascertaining if a polled inactive master device asserted the IRQ signal and made the master request by looking at a particular bit in a status register obtained from each of the polled inactive master devices.

20. The method of claim 13, wherein the data bus that is a camera control interface extension (CCIe)-compatible bus.

21. A non-transitory machine-readable storage medium having one or more instructions stored thereon, which when executed by at least one processor causes the at least one processor to:
manage communications over a data bus for all devices coupled to the data bus based on interrupt signals asserted over an interrupt request (IRQ) bus, wherein a plurality of master devices are coupled to IRQ bus and the data bus;
monitor the IRQ bus to ascertain when an IRQ signal has been asserted;
poll the inactive master devices over the data bus to ascertain which inactive master device asserted the IRQ signal on the IRQ bus; and
hand over control of the data bus to an asserting inactive master device upon obtaining an indication from the inactive master device that it made a master request.

22. A device, comprising:
a first interface to couple to a single line interrupt request (IRQ) bus to which a plurality of other devices are coupled;
a second interface to couple to a data bus to which the plurality of other devices are also coupled;
a processing circuit coupled to the first interface and second interface, the processing circuit adapted to:

manage communications over the data bus for all devices coupled to the data bus based on interrupt signals asserted over the IRQ bus;

monitor the IRQ bus to ascertain when an IRQ signal has been asserted;

poll the inactive master devices over the data bus to ascertain which inactive master device asserted the IRQ signal on the IRQ bus; and hand over control of the data bus to an asserting inactive master device upon obtaining an indication from the inactive master device that it made a master request.

23. The device of claim 22, wherein the master request from the inactive master device is obtained over the first interface.

24. The device of claim 22, wherein the indication from the inactive master device is obtained over the second interface.

25. The device of claim 22, wherein the data bus is a camera control interface extension (CCIe)-compatible bus.

26. The device of claim 22, wherein the data bus is a bidirectional bus.

27. The device of claim 22, wherein the processing circuit is further adapted to:

send an indicator to the asserting inactive master device over the data bus to transfer control of the data bus.

28. The device of claim 22, wherein the processing circuit is further adapted to:

ascertain if a polled inactive master device asserted the IRQ signal and made the master request by looking at a particular bit in a status register obtained from each of the polled inactive master devices.

* * * * *